United States Patent
Cai et al.

(10) Patent No.: US 11,106,983 B2
(45) Date of Patent: Aug. 31, 2021

(54) INTELLIGENT INTERACTION METHOD AND INTELLIGENT INTERACTION SYSTEM

(71) Applicant: Shanghai Xiaoi Robot Technology Co., Ltd., Shanghai (CN)

(72) Inventors: Liting Cai, Shanghai (CN); Pinpin Zhu, Shanghai (CN)

(73) Assignee: SHANGHAI XIAOI ROBOT TECHNOLOGY CO., LTD., Shanghai (CN)

(*) Notice: Subject to any disclaimer, the term of this patent is extended or adjusted under 35 U.S.C. 154(b) by 985 days.

(21) Appl. No.: 15/390,538

(22) Filed: Dec. 26, 2016

(65) Prior Publication Data

US 2018/0157959 A1 Jun. 7, 2018

(30) Foreign Application Priority Data

Dec. 1, 2016 (CN) .................. 201611093525.X (51) Int. Cl.
*G06N 5/04* (2006.01)
*G06F 16/335* (2019.01)
(Continued)

(52) U.S. Cl.
CPC .............. *G06N 5/04* (2013.01); *G06F 16/335* (2019.01); *G06F 40/30* (2020.01); *G06N 5/022* (2013.01);
(Continued)

(58) Field of Classification Search
CPC .......... G06N 5/04; G06N 3/006; G06N 20/00; G06N 20/10; G06N 20/20; G06N 5/022;
(Continued)

(56) References Cited

U.S. PATENT DOCUMENTS

2002/0038213 A1 3/2002 Adachi
2013/0124189 A1* 5/2013 Baldwin ................. G06F 40/20
704/9
(Continued)

FOREIGN PATENT DOCUMENTS

CN 102880645 A 1/2013
CN 103198155 A 7/2013
(Continued)

*Primary Examiner* — Shane D Woolwine
(74) *Attorney, Agent, or Firm* — Flener IP & Business Law; Zareefa B. Flener (57) ABSTRACT

Embodiments of the present invention provide an intelligent interaction method and an intelligent interaction system which are directed to resolve the problem that the conventional intelligent interaction methods are too simple and the interaction effect is not good since the response information is based on the acquired intention information only. The intelligent interaction method comprises: acquiring current request information from a user and user static information corresponding to the user; performing intention analysis on the current request information to acquire intention information corresponding to the current request information; acquiring interaction background information corresponding to the user static information; and acquiring response information according to the intention information and the interaction background information and sending the response information to the user.

20 Claims, 4 Drawing Sheets

(51) Int. Cl.
*G06F 40/30* (2020.01)
*G06N 20/00* (2019.01)
*G06N 5/02* (2006.01)
*G06N 20/10* (2019.01)
*G06N 3/00* (2006.01)
*G06F 16/242* (2019.01)

(52) U.S. Cl.
CPC ......... *G06N 20/00* (2019.01); *G06F 16/2423* (2019.01); *G06N 3/006* (2013.01); *G06N 20/10* (2019.01)

(58) Field of Classification Search
CPC .... G06F 16/335; G06F 17/2785; G06F 40/30; G06F 16/2423
USPC .......................................................... 706/11
See application file for complete search history.

(56) References Cited

U.S. PATENT DOCUMENTS

2015/0120641 A1* 4/2015 Soon-Shiong ......... G06Q 30/02
706/52
2016/0300570 A1* 10/2016 Gustafson ............. G10L 15/265

FOREIGN PATENT DOCUMENTS

| CN | 104731895 A | 6/2015 |
| CN | 105895087 A | 8/2016 |

* cited by examiner

INTELLIGENT INTERACTION METHOD AND INTELLIGENT INTERACTION SYSTEM

CROSS-REFERENCE TO RELATED APPLICATIONS

This application claims the benefit and priority of Chinese patent application No. 201611093525.X filed on Dec. 1, 2016, the entire contents of which are incorporated herein by reference.

TECHNICAL FIELD

The present invention relates to artificial intelligence technology, and more particularly to an intelligent interaction method and an intelligent interaction system.

BACKGROUND

With the continuous development of artificial intelligence technology and the continuous increase of requirements for interaction experience, intelligent interaction methods have gradually replaced some traditional human-computer interaction methods, and have become a research hotspot. However, the conventional intelligent interaction methods are only capable of performing simple semantic analysis on current request information to acquire approximate intention information and determining response information according to the acquired intention information. Since the current request information which can be used for semantic analysis is limited to standard questions that have been stored in a knowledge base, such an interaction method is rigid and brings poor user experience. In addition, with the conventional intelligent interaction methods, even though the intention information corresponding to the current request information is acquired, it does not mean that the real thoughts of the user are acquired. For example, in a phone intelligent customer service scene about credit card repayment reminding, if the current request information is a standard question "I will repay immediately", the intention information acquired will be "I'm ready to repay". However, if the user has poor credit records, it is very likely that the user doesn't want to repay, i.e., the real thought of the user is likely to be not repaying. In this case, if frequency and intensity of reminding is lowered just based on the intention information "I'm ready to repay", the effect of reminding is not good. Therefore, the response will be too simple if it is based on the acquired intention information only, and thus a good interaction effect cannot be achieved.

SUMMARY

In view of the above, embodiments of the present invention provide an intelligent interaction method and an intelligent interaction system which are directed to resolve the problem that the conventional intelligent interaction methods are too simple and the interaction effect is not good since the response information is based on the acquired intention information only.

According to an embodiment of the present invention, there is provided an intelligent interaction method comprising: acquiring current request information from a user and user static information corresponding to the user; performing intention analysis on the current request information to acquire intention information corresponding to the current request information; acquiring interaction background information corresponding to the user static information; and acquiring response information according to the intention information and the interaction background information and sending the response information to the user.

According to an embodiment of the present invention, there is also provided an intelligent interaction system comprising a knowledge base, an interaction module, an intention analysis module, a background acquisition module and a response decision module, wherein the knowledge base is configured to store intention information, interaction background information and response information; the interaction module is configured to acquire current request information from a user and user static information corresponding to the user, and send response information acquired by the response decision module to the user; the intention analysis module is configured to perform intention analysis on the current request information acquired by the interaction module to acquire the intention information corresponding to the current request information from the knowledge base; the background acquisition module is configured to acquire the interaction background information corresponding to the user static information from the knowledge base; and the response decision module is configured to acquire the response information from the knowledge base according to the intention information and the interaction background information.

With the intelligent interaction method and the intelligent interaction system according to embodiments of the present invention, in addition to acquiring intention information corresponding to the current request information, the interaction background information corresponding to the user static information will be acquired too. The interaction background information will be combined with the acquired intention information to obtain the response information. Since the interaction background information corresponds to the user static information, combination of the intention information of the semantic level with the interaction background information of the user's static information level facilitates more accurate determination of the user's true thoughts. In addition, even for the same intention information, the response information may be different for different users due to different static information. Thus a more intelligent and more diversified response mode can be realized, which improves the effect of intelligent interaction.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. It will be understood that various changes and modifications can be made by one ordinary skilled in the art within the spirit and scope of the present invention. Various features of the embodiments can be mixed and matched in any manner, to produce further embodiments consistent with the present invention. Accordingly, the embodiments are merely described below, by referring to the figures, to explain aspects of the present description.

Figure 1:
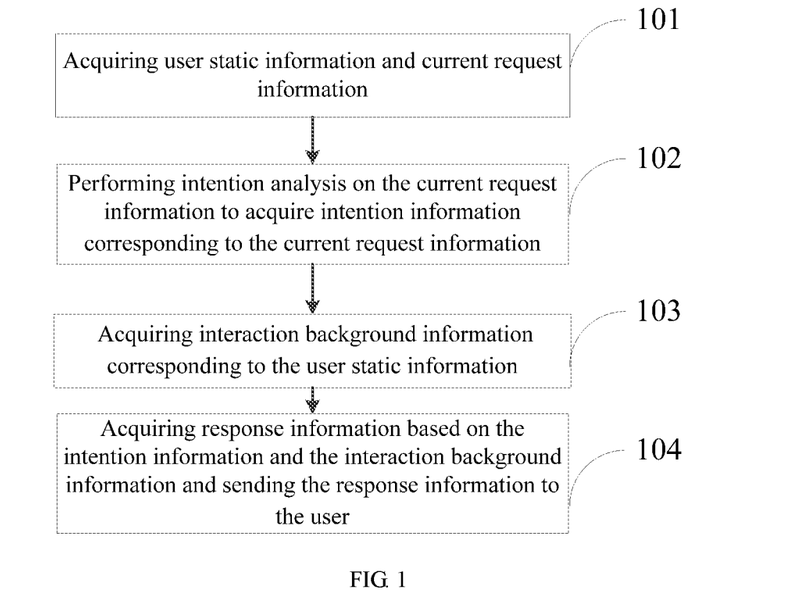
FIG. 1 is a flowchart illustrating an intelligent interaction method according to an embodiment of the present invention.

FIG. 1 is a flowchart illustrating an intelligent interaction method according to an embodiment of the present invention. As shown in FIG. 1, the method comprises the following steps.

Step 101: acquiring user static information and current request information.

The current request information is a message sent by a user which contains the user's intention on the semantic level, and may be in a format of either text or voice. Corresponding response information will be generated according to the current request information, and be sent to the user so as to complete one level of intelligent interaction. However, the current request information does not necessarily represent the true intention of the user, so user static information is required to help determination of the true intention of the user, and thus more reasonable response information can be acquired.

The user static information is static information related to the user, which can be acquired through user input, e.g., through a multi-level interaction process, or directly acquired through a third party, e.g., directly from user data stored in a bank database. To facilitate understanding, taking a service scene about credit card repayment reminding as an example, examples of contents of the user static information is shown in Table 1 below:

TABLE 1

| Credit card service attribute | User identity information | Credit card type | Current billing period | Total debt | The amount has been repaid |
| --- | --- | --- | --- | --- | --- |
| Credit card debt | James Smith | Platinum card | M1 | $28000 | $0 |
| Credit card debt | John Brown | Ordinary card | M1 | $3000 | $1000 |
| Credit card debt | Mary Johnson | Golden card | M3 | $12000 | $3000 |
| Credit card debt | Robert Jones | Golden card | M2 | $20000 | $0 |
| Credit card debt | Linda Davis | Golden card | M2 | $8000 | $4000 |

As shown in Table 1, the user static information is classified into six categories: credit card service attribute, user identity information, credit card type, current billing period, total debt and the amount has been repaid. Classification of the static information can be performed either before or after the user static information is acquired. In addition, the number of categories of the user static information can vary according to different service scenes, and the present invention is not limited thereto. It is to be noted that the acquired user static information is only raw data related to credit records of users, interaction background information corresponding to the user static information should be acquired to acquire the credit levels of the users reflected by the raw data, and serve as a basis of determination of reasonable response information in subsequent processes.

Step 102: performing intention analysis on the current request information to acquire intention information corresponding to the current request information.

The intention information corresponds to the intention reflected by the current request information on the semantic level, and does not necessarily represent the true intention of the user, so interaction background information corresponding to the user static information is needed to be combined in subsequent processes to determine corresponding response information.

Figure 2:
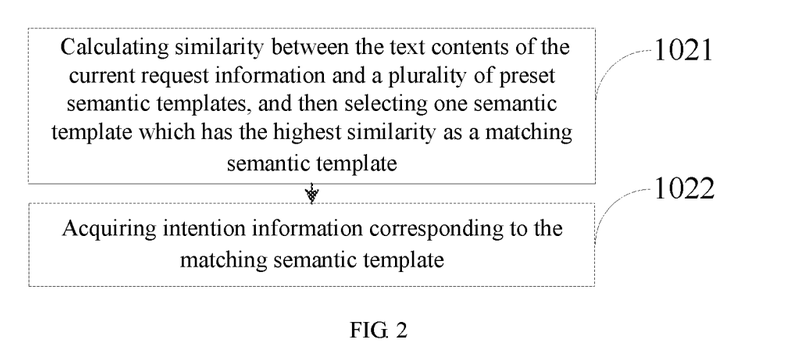
FIG. 2 is a flowchart illustrating steps of acquiring intention information in the intelligent interaction method according to an embodiment of the present invention.

The intention information can be acquired by text analysis. Specifically, firstly text contents of the current request information are matched with a plurality of preset semantic templates to determine a matching semantic template. The matching process can be implemented by text similarity calculation. As shown in FIG. 2, a method for acquiring the intention information may specifically include the following steps.

Step 1021: calculating similarity between the text contents of the current request information and a plurality of preset semantic templates, and then selecting one semantic template which has the highest similarity as a matching semantic template.

Generally, in the current request information sent by users, extended questions, i.e., variations of standard questions, are also used in addition to the standard questions. Therefore, for intelligent semantic recognition, the knowledge base is also required to store the extended questions which are slightly different from the standard questions but represent the same meaning. Thus, in an embodiment of the present invention, one semantic template is a set of one or more abstract semantic expressions representing a certain type of semantic contents, and is generated based on the semantic contents with predetermined rules. That is, one semantic template can describe a plurality of different expressions of the corresponding semantic contents, so as to cover a variety of possible variations of the text contents of the current request information. Matching between the text contents of the current request message and a predefined semantic template avoids the limitation of recognizing user messages with just standard questions each representing only one expression.

Each abstract semantic expression can mainly include semantic component words and semantic rule words. The semantic component words are represented by semantic component symbols which express various specific semantics when filled with corresponding values, i.e., contents.

The semantic component symbols having abstract semantics can include:

[concept]: a word or phrase representing a subject component or an object component, e.g., "ring tones" in "How to set up ring tones?".

[action]: a word or phrase representing an action component, e.g., "open" in "How to open a credit card account?".

[attribute]: a word or phrase representing an attribute component, e.g., "colors" in "How many colors do iphones have?".

[adjective]: a word or phrase representing a modification component, e.g., "cheaper" in "Which refrigerator is cheaper?".

Some examples of the major abstract semantic types are:
concept description, e.g., "What is the [concept]?"
attribute composition, e.g., "What [attributes] does the [concept] have?"
behavior mode, e.g., "How did the [concept] [action]?"
behavior place, e.g., "Where did the [concept] [action]?"
behavior reason, e.g., "Why did the [concept] [action]?"
behavior prediction, e.g., "Will the [concept] [action]?"
behavior judgment, e.g., "Did the [concept] [action]?"
attribute status, e.g., "Is the [attribute] of the [concept] [adjective]?"
attribute judgment, e.g., "Does the [concept] have [attribute]?"
attribute reason, e.g., "Why is the [attribute] of the [concept] [adjective]?"
concept comparison, e.g., "What's the difference between the [concept1] and the [concept2]?"
attribute comparison, e.g., "What's the difference between the [attribute] of the [concept1] and that of the [concept2]?"

In the abstract semantic level, component judgment for questions can be implemented with tagging of parts of speech. For example, the parts of speech corresponding to the concept, the action, the attribute and the adjective are noun, verb, noun and adjective respectively.

Taking behavior mode, e.g., "How did the [concept] [action]?", as an example, the abstract semantic set of this type may include a plurality of abstract semantic expressions:
Abstract semantic type: behavior mode
Abstract semantic expressions:
a. [how] [can should] [concept] [action]
b. {[concept]~[action]}
c. [concept] [action]
d. <Any way to><get>[concept][action] (participle pass (ed))
e. [how to] [action]~[concept]

All of the above-mentioned abstract semantic expressions are used to describe the abstract semantic type "behavior mode". Here, the semantic symbol "|" indicates an OR relationship, and the semantic symbol "?" indicates that the element is optional.

It will be understood that, while some examples of semantic component words, semantic rule words and semantic symbols are set forth above, the specific contents and parts of speech of the semantic component words and the semantic rule words as well as definitions and collocations of the semantic symbols can be predefined based on specific interaction service scenes used by the intelligent interaction method, and the present invention is not limited thereto.

In an embodiment of the present invention, calculation of similarity to determine a matching semantic template according to the text contents of the current request information may be implemented with one or more of an editing distance calculation method, an n-gram calculation method, a JaroWinkler calculation method and a Soundex calculation method. In a further embodiment, after the semantic component words and the semantic rule words included in the text contents of the current request information is recognized, the semantic component words and the semantic rule words included in the current request information and the semantic templates can be further transformed to simplified textual character strings to improve the efficiency of semantic similarity calculation.

In an embodiment of the present invention, the semantic template may be composed of semantic component words and semantic rule words, as described above, and these semantic component words and semantic rule words are associated with the parts of speeches of these words in the semantic template and the grammar relationship of these words. Therefore, the similarity calculation may specifically include: firstly recognizing words in the texts of the current request information as well as parts of speeches and grammar relationship thereof then recognizing the semantic component words and the semantic rule words based on the parts of speeches and grammar relationship of the recognized words; and lastly introducing the recognized semantic component words and semantic rule words into a vector space model so as to calculate a plurality of similarity degrees between the text contents of the current request information and a plurality of preset semantic templates. In an embodiment of the present invention, one or more of the conventional word segmentation methods, e.g., a hidden Markov model method, a forward maximum matching method, a reverse maximum matching method and a named entity recognition method, may be used to recognize words in the texts of the current request information as well as parts of speeches and grammar relationship thereof.

In an embodiment of the present invention, the semantic template may be a set of a plurality of abstract semantic expressions representing a certain type of semantic contents, and thus can describe a plurality of different expressions of the corresponding semantic contents, so as to correspond to a plurality of extended questions of a same standard question. Therefore, when the semantic similarity between the text contents of the current request information and the preset semantic templates is calculated, it is required to calculate the similarity between the text contents of the current request information and respective at least one expanded question expanded from the plurality of preset semantic templates, and then the semantic template corresponding to the expanded question having the highest similarity is selected as the matching semantic template. These expanded questions can be acquired from semantic component words and/or semantic rule words and/or semantic symbols included in the semantic template.

Step 1022: acquiring intention information corresponding to the matching semantic template.

After the matching semantic template corresponding to the text contents of the current request information is selected, the intention information corresponding to the matching semantic template can be acquired. Here, the corresponding relationship between the semantic template and the intention information can be pre-established, and the same intention information can correspond to one or more semantic templates, which is shown in Table 2 below.

TABLE 2

| Current request information | Matching semantic template | Intention information |
|---|---|---|
| I pay off every month. | [every month\|before] [pay off][on time\|in time] | Doubting debt |
| I'm running out of business. | [loss money] [in business] | Expressing lack of money and not willing to repay |
| Can I repay by instalments? | [repay] [instalments][@number][month] | Negotiating repayment |

TABLE 2-continued

| Current request information | Matching semantic template | Intention information |
|---|---|---|
| I will scrape the money together. | [raise\|collect][money] | Repay fully |

In an embodiment of the present invention, if the current request information is a voice message and if the similarity calculation for acquiring a matching semantic template is based on texts, the current request information is required to be converted into a text message firstly.

Step 103: acquiring interaction background information corresponding to the user static information.

The interaction background information is related to static properties of the user, independent of the semantic contents of the current request information. The interaction background information can be acquired either directly by a third party or real-time based on the user static information.

Still taking the service scene about credit card repayment reminding as an example, the user static information is raw data which is related to the user's credit records only. In order to acquire the user's credit level which is potentially reflected in the raw data, it is required to acquire interaction background information corresponding to the user static information and use it as a basis to determine a reasonable response message in the subsequent processes. The interaction background information acquired based on the user static information shown in Table 1 is shown in Table 3 below:

TABLE 3

| Credit card service attribute | Current billing period | Debt history status | Repayment history status |
|---|---|---|---|
| Credit card debt | M2 | Never | No repayment |
| Credit card debt | M2 | Never | Partial repayment |
| Credit card debt | M2 | Never | Interval repayment |
| Credit card debt | M2 | Ever | No repayment |
| Credit card debt | M2 | Ever | Partial repayment |
| Credit card debt | M2 | Ever | Interval repayment |

The interaction background information shown in Table 3 includes four types of interaction background items, i.e., credit card service attribute, current billing period, debt history status and repayment history status. Contents of each interaction background item may vary. For example, the interaction background item "repayment history status" may include different interaction background contents: "No repayment", "Partial repayment" and "Interval repayment". The interaction background item "credit card service attribute" may include, in addition to "credit card debt", other interaction background contents such as "new credit card application", "credit card quota query", "credit card repayment", "credit card cancellation" and the like. The number and contents of specific interaction background items and the interaction background contents may be adjusted according to the specific service scenes, and the present invention is not limited thereto.

Figure 3:
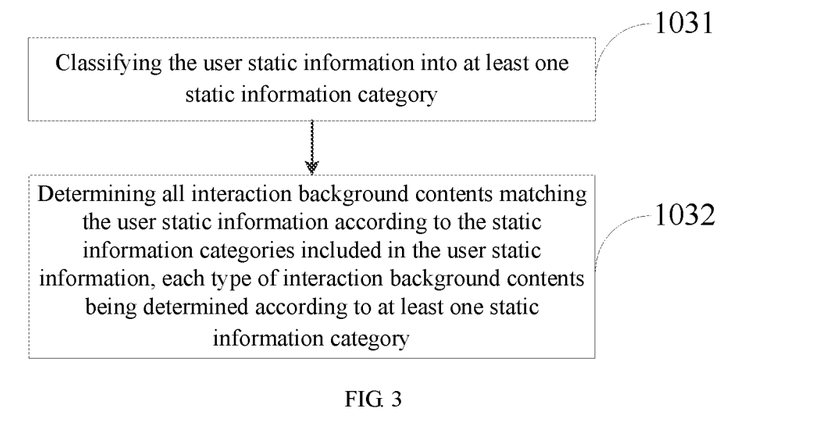
FIG. 3 is a flowchart illustrating steps of acquiring interaction background information according to user static information in the intelligent interaction method according to an embodiment of the present invention.

In an embodiment of the present invention, the interaction background information is not acquired directly from the user static information. Instead, the user static information is classified firstly, and then the classification result is used to acquire the interaction background information corresponding to the user static information. Specifically, as shown in FIG. 3, a method of acquiring the interaction background information may include the following steps.

Step 1031: classifying the user static information into at least one static information category.

For the above-mentioned service scene about credit card repayment reminding, classifying the user static information into at least one static information category is acquiring the contents shown in Table 1. The specific processing can be performed through large data and classification model, which is well known in the art and is not described in detail herein.

Step 1032: determining all interaction background contents matching the user static information according to the static information categories included in the user static information, each type of interaction background contents being determined according to at least one static information category.

In detail, when all static information categories included in the user static information is acquired, some static information categories can be directly matched to the interaction background contents of one interaction background item, that is, the interaction background contents can be directly determined according to only one static information category. For example, the interaction background contents "credit card debt" of the interaction background item "credit card service attribute" can be directly determined according to the specific contents "credit card debt" of the user static information category "credit card service attribute". In contrast, some interaction background contents should be determined according to more than one information category. For example, the interaction background contents of the interaction background item "repayment history status" should be determined according to contents of three static information categories: "current rebilling period", "total debt" and "the amount has been repaid".

In an embodiment of the present invention, the above processing for acquiring the interaction background contents from the user static information may be realized by pre-establishing correspondence relationship between the user static information and the interaction background contents. The specific correspondence relationship may be generated by classification training in a large data platform based on training sets developed by the service experts. In addition, when the actual service characteristics change, a new training set can be submitted as a basis for new training so that new correspondence relationship can be acquired.

It will be understood that the specific contents of the interaction background information are related to the specific contents of the user static information, and the user static information may contain different data contents depending on the applicable application scenes. The present invention is not limited to the specific contents of the user static information and the corresponding interaction background information.

Step 104: acquiring response information based on the intention information and the interaction background information and sending the response information to the user.

Combination of the interaction background information and the intention information makes it possible to determine real thoughts of users more accurately. So for the same intention information, the response information may be different for different uses due to different user static information, thereby realizing a diversified response mode and a good intelligent interaction effect.

Figure 4:
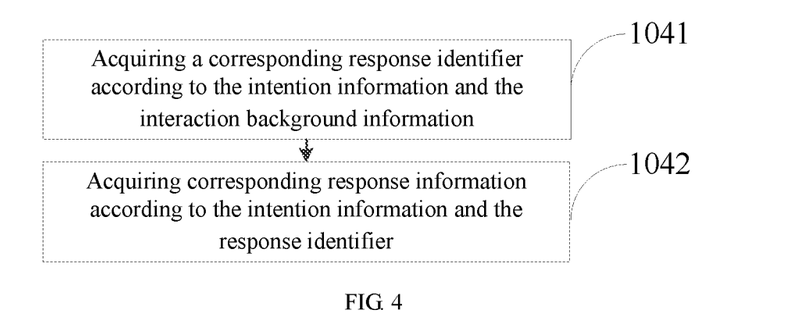
FIG. 4 is a flowchart illustrating steps of acquiring response information according to the intention information and the interaction background information corresponding to the user static information in the intelligent interaction method according to an embodiment of the present invention.

FIG. 4 is a flowchart illustrating steps of acquiring response information according to the intention information and the interaction background information corresponding to the user static information in the intelligent interaction method according to an embodiment of the present invention. As shown in FIG. 4, a method of acquiring the response information includes the following steps.

Step 1041: acquiring a corresponding response identifier according to the intention information and the interaction background information.

In an embodiment of the present invention, the response identifier may be a response tone identifier which can be classified into at least two categories from stern tone to gentle tone. Still taking the above-mentioned service scene about credit card repayment reminding as an example, the specific contents of the response tone identifier can be shown in Table 4 below.

TABLE 4

| Intention information | Credit card service attribute | Current billing period | Debt history status | Repayment history status | Response tone identifier |
|---|---|---|---|---|---|
| No money to repay | Credit card debt | M2 | Never | No repayment | Gentle reminding |
| No money to repay | Credit card debt | M2 | Never | Partial repayment | General reminding |
| No money to repay | Credit card debt | M2 | Never | Interval repayment | Serious reminding |
| No money to repay | Credit card debt | M2 | Ever | No repayment | Stern reminding |
| No money to repay | Credit card debt | M2 | Ever | Partial repayment | Serious reminding |

As shown in Table 4 above, for the same intention information "no money to repay", the response tone identifiers may be different for different interaction background information. For example, when the interaction background information determined according to the user static information is "M2 period, never debt, partial repayment", it indicates that the current user has relatively good credit records, and the debt has been repaid partially in the M1 period, thus maybe some other facts make the user unable to repay in time. Therefore, the response tone identifier can be determined as "general reminding". As another example, when the interaction background information determined according to the user static information is "M2 period, ever debt, no repayment", it indicates that the current user has poor credit records, and there is no repayment in the previous M1 period. Therefore, the response tone identifier can be determined as "stern reminding".

Step 1042: acquiring corresponding response information according to the intention information and the response identifier.

After acquiring the response identifier, the response information to be sent to the user can be determined according to both the intention information and the response identifier. In an embodiment of the present invention, when the mode of interaction with the user is based on speech and the response information is in text form, it is further required to convert the response information into a voice message to be sent to the user.

For example, taking the response tones shown in Table 4 as an example, the specific contents of the response information can be shown in the Table 5 below:

TABLE 5

| Intention information | Response tone identifier | Response information |
|---|---|---|
| No money to repay | Gentle reminding | Please pay off your debts within three days. |
| No money to repay | General reminding | Be sure to remember to pay off your debts within three days. |
| No money to repay | Serious reminding | If you don't pay off your debts quickly, your credit will be impacted and you will be difficult to get car loans and home loans. |
| No money to repay | Stern reminding | If you don't pay off your debts quickly, you will be sued. |

Thus, by introducing the response identifiers into determination of the response information, compared to the method of determining the response information just based on the intention information, a more flexible response mode and a better interaction effect can be achieved.

In another embodiment of the present invention, the response information may be acquired directly according to the response identifier, without referring to the intention information again. For example, for the case in which the intention information is "no money to repay" and the interaction background information shows that the current user has good credit records, the response identifier is designed as "general reminding to repayment", rather than "general reminding" in Table 4. Here, the response identifier "general reminding to repayment" corresponds to the response information "Be sure to remember to pay off your debts within three days." directly. In other words, if the intention information is "no money to repay" and the interaction background information shows that the current user has good credit records, the response identifier "general reminding to repayment" can be acquired, and then the response information "Be sure to remember to pay off your debts within three days." can be acquired directly from the response identifier "general reminding to repayment", without the need of referring to the intention information again like in Table 5. In this case, the response identifiers are more diverse compared with the above-mentioned embodiment, and the processing is more simple since the intention information is referred to just once.

It will be understood that in order to complete the processes of acquiring the response identifier and the response information, correspondence relationship among the intention information, the interaction background information and the response identifier, correspondence relationship among the intention information, the response identifier and the response information, and correspondence relationship between the response identifier and the response information may be pre-established. The above-mentioned correspondence relationship can be established through large data classification and clustering technology, which is well known in the art and is not described in detail herein.

The response identifier is the response tone identifier in the above-mentioned embodiment, but the present invention is not limited thereto. The response identifier may correspond to other services in other application scenes. For example, the response identifier may be a response pitch identifier which is classified into at least two categories from low pitch to high pitch; and/or a response speed identifier which is classified into at least two categories from high speed to low speed, and/or a response volume identifier which is classified into at least two categories from low volume to high volume. The specific contents of the response identifiers are not limited in the present invention.

Furthermore, it will be understood that the intelligent interaction method provided in embodiments of the present invention actually realizes an intelligent interaction strategy having high intelligence. Each interaction process can be regarded as processes of acquiring the intention information based on the current request information, acquiring the response information based on the intention information and the interaction background information, and sending the response information to the user. After receiving the response message, the user may send out a new request message, and then new processes of acquiring the response information and sending the response information to the user will be implemented, which will be repeated until the whole intelligent interaction process is completed. It will be also understood that the intelligent interaction method may be applied to different service interaction scenes. Depending on the specific demands of the service interaction scenes, the developers may adjust the order of the steps in the intelligent interaction method, omitting some of the steps or assigning specific contents for the terms of semantic template, intention information, user static information, interaction scene information, response identifier and response information. Thus the above is just illustration and the present invention is not limited thereto.

Figure 5:
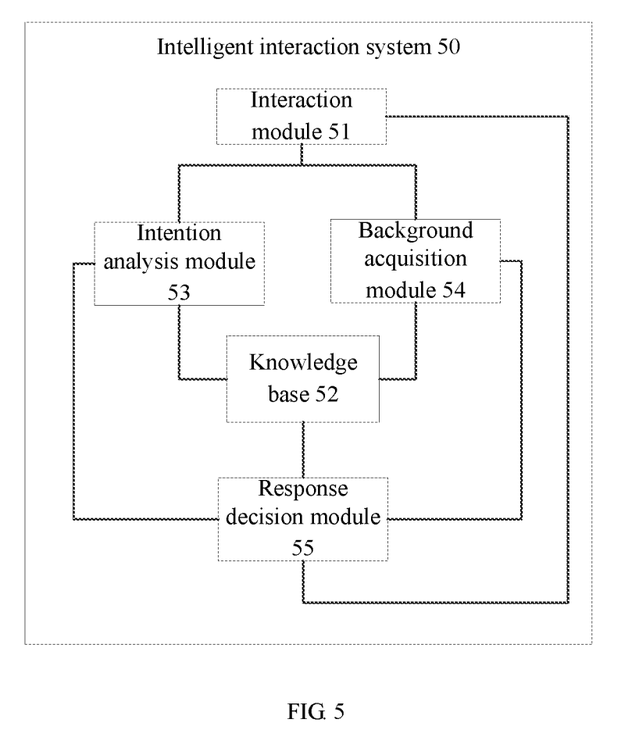
FIG. 5 is a schematic structural view illustrating an intelligent interaction system according to an embodiment of the present invention.

FIG. 5 is a schematic structural view illustrating an intelligent interaction system according to an embodiment of the present invention. As shown in FIG. 5, an intelligent interaction system 50 includes an interaction module 51, a knowledge base 52, an intention analysis module 53, a background acquisition module 54 and a response decision module 55. Here, the knowledge base 52 stores intention information, interaction background information and response information. The interaction module 51 is configured to perform an interaction process to acquire user static information and current request information. The intention analysis module 53 is configured to perform intention analysis on the current request information acquired by the interaction module 51, and acquire intention information corresponding to the current request information from the knowledge base 52. The background acquisition module 54 acquires interaction background information corresponding to the user static information from the knowledge base 52. The response decision module 55 acquires corresponding response information from the knowledge base 52 based on the intention information acquired by the intention analysis module 53 and the interaction background information acquired by the background acquisition module 54, and sends the response information to the user through the interaction module 51.

In an embodiment of the present invention, the intention analysis module 53 acquires the intention information by text analysis. Specifically, firstly text contents of the current request information is matched with a plurality of preset semantic templates to determine a matching semantic template. The matching process can be implemented by text similarity calculation.

It can be seen that the intelligent interaction system 50 according to the embodiment of the present invention combines the intention information of the semantic level with the interaction background information of the user's static information level to more accurately determine the user's true thoughts. In addition, even for the same intention information, the response information may be different for different users due to different static information. Thus a more intelligent and more diversified response mode can be realized, which improves the effect of intelligent interaction.

Figure 6:
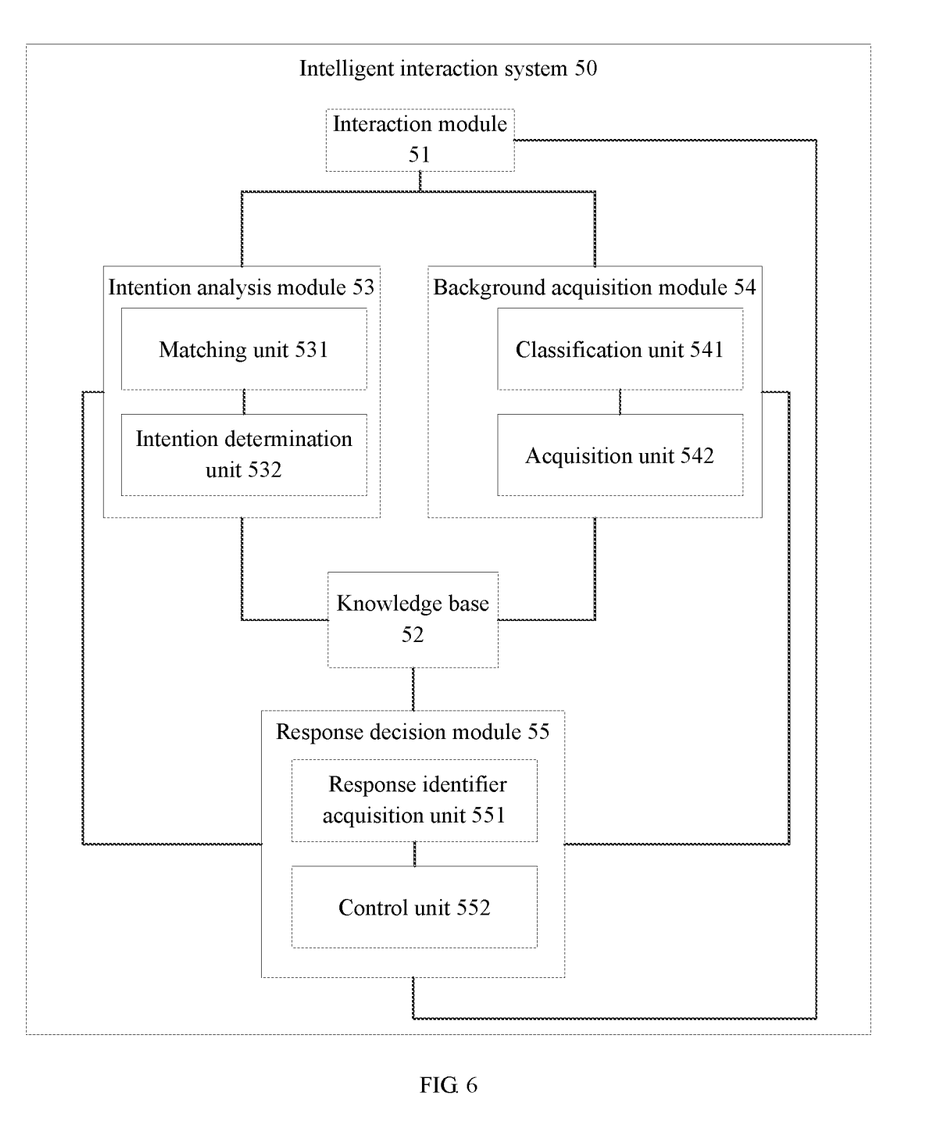
FIG. 6 is a schematic structural view illustrating an intelligent interaction system according to another embodiment of the present invention.

In an embodiment of the present invention, the knowledge base 52 stores pre-established correspondence relationship among the intention information, the interaction background information and the response identifier as well as pre-established corresponding relationship among the intention information, the response identifier and the response information. In this case, as shown in FIG. 6, the response decision module 55 includes a response identifier acquisition unit 551 and a control unit 552. The response identifier acquisition unit 551 acquires a corresponding response identifier from the knowledge base 52 according to the intention information and the interaction background information, and the control unit 552 acquires the corresponding response information from the knowledge base 52 according to the intention information and the response identifier.

In another embodiment of the invention, the knowledge base 52 stores pre-established correspondence relationship among the intention information, the interaction background information and the response identifier as well as pre-established corresponding relationship between the response identifier and the response information. In this case, the response identifier acquisition unit 551 included in the response decision module 55 acquires a corresponding response identifier from the knowledge base 52 according to the intention information and the interaction background information, and the control unit 552 included in the response decision module 55 acquires the corresponding response information from the knowledge base 52 according to the response identifier. By introducing the response identifier to determine the response information, compared to the mode of determining the response information according to the intention information only, a more flexible response mode can be realized, and a better intelligent interaction effect can be achieved.

In an embodiment of the present invention, correspondence relationship among the intention information, the interaction background information and the response identifier, correspondence relationship among the intention information, the response identifier and the response information, and correspondence relationship between the response identifier and the response information may be pre-established through large data classification and clustering technology.

In an embodiment of the present invention, the response identifier may correspond to attributes associated with specific contents of interaction services. For example, the response identifier may be a response tone identifier which is classified into at least two categories from gentle tone to stern tone; and/or a response pitch identifier which is classified into at least two categories from low pitch to high pitch; and/or a response speed identifier which is classified into at least two categories from high speed to low speed, and/or a response volume identifier which is classified into at least two categories from low volume to high volume. The specific contents of the response identifiers are not limited in the present invention.

In an embodiment of the present invention, in order to acquire interaction background information reflected by the user static information, the user static information is classified firstly. In this case, the background acquisition module 54 may be further configured to classify the user static information and then acquire the interaction background information corresponding to the user static information from the knowledge base 52.

In an embodiment of the present invention, the interaction background information may include at least one interaction background item, and each interaction background item includes at least one kind of interaction background contents.

In an embodiment of the present invention, as shown in FIG. 6, the background acquisition module 54 includes a classification unit 541 and an acquisition unit 542. The classification unit 541 is configured to classify the user static information into at least one static information category. The acquisition unit 542 is configured to determine all interaction background contents matching the user static information according to the static information categories included in the user static information, each type of interaction background contents being determined according to at least one static information category. In detail, when the acquisition unit 542 acquires all static information categories included in the user static information, some static information categories can be directly matched to the interaction background contents of one interaction background item, that is, the interaction background contents can be directly determined according to only one static information category. In other cases, the interaction background contents may be determined according to a plurality of static information categories.

In an embodiment of the present invention, the user static information is classified into one or more of the following categories of static information: credit card service attribute, user identity information, credit card type, current billing period, total debt and the amount has been repaid. The interaction background information includes one or more of the following types of interaction background items: credit card service attribute, current billing period, debt history status and repayment history status. The interaction background item "credit card service attribute" may include one or more of credit card debt, new credit card application, credit line inquiry, credit card repayment and credit card cancellation. The interaction background item "debt history status" may include different interaction background contents: "never" and "ever". The interaction background item "repayment history status" may include different interaction background contents: "no repayment", "partial repayment" and "interval repayment". It will be understood that the specific contents of the interaction background information is related to the specific contents of the user static information, and the user static information may contain different data contents depending on the applicable application scenes. The specific contents of the user static information and the corresponding interaction background information is not limited in the present invention.

In an embodiment of the present invention, the interaction module 51 may acquire the user static information through user input or interaction with a third party, e.g., directly from user data stored in a bank database.

In an embodiment of the present invention, as shown in FIG. 6, the intention analysis module 53 includes a matching unit 531 and an intention determination unit 532. The matching unit 531 is configured to match text contents of the current request information with a plurality of preset semantic templates to determine a matching semantic template. The intention determination unit 532 is configured to acquire the intention information corresponding to the matching semantic template and stores the intention information in the knowledge base 52. Here, the corresponding relationship between the semantic template and the intention information can be pre-established, and the same intention information can correspond to one or more semantic templates.

Furthermore, in the current request information sent by users, extended questions, i.e., variations of standard questions, are also used in addition to the standard questions. Therefore, for intelligent semantic recognition, the knowledge base 52 is also required to store the extended questions which are slightly different from the standard questions but represent the same meaning. Thus, in an embodiment of the present invention, one semantic template is a set of one or more abstract semantic expressions representing a certain type of semantic contents, and is generated according to the semantic contents with predetermined rules. That is, one semantic template can describe a plurality of different expressions of the corresponding semantic contents, so as to cover a variety of possible variations of the text contents of the current request information. Matching between the text contents of the current request message and a predefined semantic template avoids the limitation of recognizing user messages with just standard questions each representing only one expression.

In an embodiment of the present invention, the matching unit 531 determines the matching semantic template according to the text contents of the current request information by similarity calculation. In this case, the matching unit 531 calculates similarity between the text contents of the current request information and a plurality of preset semantic templates, and then selects one semantic template which has the highest similarity as the matching semantic template.

In an embodiment of the present invention, similarity calculation may be implemented by the matching unit 531 with one or more of an editing distance calculation method, an n-gram calculation method, a JaroWinkler calculation method and a Soundex calculation method. In a further embodiment, after the semantic component words and the semantic rule words included in the text contents of the current request information is recognized, the semantic component words and the semantic rule words included in the current request information and the semantic templates can be further transformed to simplified textual character strings to improve the efficiency of semantic similarity calculation.

In an embodiment of the present invention, if the current request information is a voice message and if the intention analysis module 53 performs intention analysis according to text contents, the interaction module 51 may further include a text conversion unit configured to convert the current request information into a text message.

It will be understood that each module or unit included in the intelligent interaction system 50 according to the above-mentioned embodiments corresponds to one of the aforementioned steps. Thus, the operations and features described associated with the foregoing steps are equally applicable to the intelligent interaction system 50 and the corresponding modules and units contained therein, and the repetitive contents will not be repeated herein.

The teachings of the present invention may also be embodied as a computer program product of a computer readable storage medium comprising computer program code which when executed by a processor enables the processor to implement the intelligent interaction method according to an embodiment of the present invention. The computer storage medium may be any tangible medium, such as a floppy disk, a CD-ROM, a DVD, a hard disk drive or a network medium.

Furthermore, the methods and systems according to embodiments of the present invention may be implemented in software, hardware, or a combination of software and hardware. The hardware may be implemented using dedicated logic. The software may be stored in a storage and executed by an appropriate instruction execution system, such as a microprocessor or dedicated design hardware. It will be appreciated by those of ordinary skill in the art that the above-described methods and systems may be implemented using computer-executable instructions and/or included in processor control code, which may be provided in a carrier medium such as a disk, a CD or a DVD-ROM, a programmable storage such as read-only memory (firmware), or a data carrier such as an optical or electrical signal carrier. The methods and systems according to embodiments of the present invention may be implemented by hardware circuits such as very large scale integrated circuits or gate arrays, semiconductors such as logic chips, transistors, or programmable hardware devices such as field programmable gate arrays, programmable logic devices, or be implemented in software executed by various types of processors, or may be implemented by a combination of the above described hardware circuit and software, such as firmware.

It will be understood that while several modules or units of the systems are mentioned in the detailed description hereinabove, such division is merely exemplary and not compulsory. In fact, features and functions of the two or more modules/units described above may be implemented in one module/unit, or the features and functions of one module/unit described above may be further divided into multiple modules/units. In addition, some of the modules/units described above may be omitted in certain application scenes.

It will be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. An intelligent interaction method, in a service scene about credit card repayment reminding, comprising:
   acquiring, by an intelligent interaction system, current request information from a user and user static information corresponding to the user, the current request information being a message, which contains a user's intention on the semantic level, sent by the user in an intelligent interaction between the intelligent interaction system and the user;
   performing intention analysis on the current request information to acquire intention information corresponding to the current request information, the intention information being the user's intention whether to make a repayment reflected by the current request information on the semantic level;
   acquiring interaction background information corresponding to the user static information to help determination of a true intention of the current request information, the true intention comprising the user's true thought whether the user wants to make a repayment; and
   acquiring response information corresponding to the true intention of the current request information according to the intention information and the interaction background information and sending the response information to the user, the response information comprising information for reminding to repayment.

2. The method of claim 1, wherein acquiring response information corresponding to the true intention of the current request information according to the intention information and the interaction background information comprises:
   acquiring a corresponding response identifier according to the intention information and the interaction background information; and
   acquiring the response information corresponding to the true intention of the current request information according to the intention information and the response identifier,
   wherein correspondence relationship among the intention information, the interaction background information and the response identifier is pre-established, and correspondence relationship among the intention information, the response identifier and the response information is pre-established.

3. The method of claim 1, wherein acquiring response information corresponding to the true intention of the current request information according to the intention information and the interaction background information comprises:
   acquiring a corresponding response identifier according to the intention information and the interaction background information; and
   acquiring the response information corresponding to the true intention of the current request information according to the response identifier,
   wherein correspondence relationship among the intention information, the interaction background information and the response identifier is pre-established, and correspondence relationship between the response identifier and the response information is pre-established.

4. The method of claim 1, wherein acquiring interaction background information corresponding to the user static information to help determination of a true intention of the current request information comprises:
   classifying the user static information, and acquiring the interaction background information corresponding to the user static information based on a classification result.

5. The method of claim 4, wherein the interaction background information comprises at least one interaction background item, each interaction background item comprises at least one type of interaction background contents.

6. The method of claim 5, wherein classifying the user static information and acquiring the interaction background information corresponding to the user static information based on a classification result comprises:
   classifying the user static information into at least one static information category; and
   determining all types of interaction background contents matching the user static information according to the static information categories included in the user static information, each type of the interaction background contents being determined according to at least one of the static information categories.

7. An intelligent interaction system, in a service scene about credit card repayment reminding, comprising a knowledge base, an interaction module, an intention analysis module, a background acquisition module and a response decision module, wherein
   the knowledge base is configured to store intention information, interaction background information and response information;

the interaction module is configured to acquire current request information from a user and user static information corresponding to the user, and send response information acquired by the response decision module to the user, the current request information being a message, which contains a user's intention on the semantic level, sent by the user in an intelligent interaction between the intelligent interaction system and the user;

the intention analysis module is configured to perform intention analysis on the current request information acquired by the interaction module to acquire the intention information corresponding to the current request information from the knowledge base, the intention information being the user's intention whether to make a repayment reflected by the current request information on the semantic level;

the background acquisition module is configured to acquire the interaction background information corresponding to the user static information from the knowledge base to help determination of a true intention of the current request information, the true intention comprising the user's true thought whether the user wants to make a repayment; and the response decision module is configured to acquire the response information corresponding to the true intention of the current request information from the knowledge base according to the intention information and the interaction background information, the response information comprising information for reminding to repayment.

8. The system of claim 7, wherein the knowledge base is further configured to store pre-established correspondence relationship among the intention information, the interaction background information and response identifier, and pre-established corresponding relationship among the intention information, the response identifier and the response information;

wherein the response decision module comprises:
a response identifier acquisition unit configured to acquire a corresponding response identifier from the knowledge base according to the intention information and the interaction background information; and
a control unit configured to acquire the response information corresponding to the true intention of the current request information from the knowledge base according to the intention information and the response identifier.

9. The system of claim 7, wherein the knowledge base is further configured to store pre-established correspondence relationship among the intention information, the interaction background information and response identifier, and pre-established corresponding relationship between the response identifier and the response information;

wherein the response decision module comprises:
a response identifier acquisition unit configured to acquire a corresponding response identifier from the knowledge base according to the intention information and the interaction background information; and
a control unit configured to acquire the response information corresponding to the true intention of the current request information from the knowledge base according to the response identifier.

10. The system of claim 8, wherein the response identifier is any of a response tone identifier which is classified into at least two categories from a gentle tone to a stern tone, a response pitch identifier that is classified into at least two categories from a high pitch to a low pitch, a response speed identifier which is classified into at least two categories from a low speed to a high speed, and a response volume identifier which is classified into at least two categories from a low volume to a high volume, or any combination thereof.

11. The system of claim 8, wherein the correspondence relationship among the intention information, the interaction background information and the response identifier and the correspondence relationship among the intention information, the response identifier and the response information is pre-established through large data classification and clustering technology.

12. The system of claim 7, wherein the background acquisition module is further configured to classify the user static information and acquire the interaction background information corresponding to the user static information from the knowledge base based on a classification result.

13. The system of claim 12, wherein the interaction background information comprises at least one interaction background item, each interaction background item comprises at least one type of interaction background contents.

14. The system of claim 13, wherein the background acquisition module comprises:
a classification unit configured to classify the user static information into at least one static information category; and
an acquisition unit configured to determine all interaction background contents matching the user static information according to the static information categories included in the user static information, each of the interaction background contents being determined according to at least one of the static information categories.

15. The system of claim 14, wherein the user static information is classified into at least one of the following static information categories: credit card service attribute, user identity information, credit card type, current billing period, total debt and the amount has been repaid;

wherein the interaction background information includes at least one of the following interaction background items: credit card service attribute, current billing period, debt history status and repayment history status;

wherein the credit card service attribute includes at least one of the following interaction background contents: credit card debt, new credit card application, credit line inquiry, credit card repayment and credit card cancellation;

wherein the debt history status includes two interaction background contents: never and ever; and wherein the repayment history status includes at least one of the following interaction background contents: no repayment, partial repayment and interval repayment.

16. The system of claim 7, wherein the interaction module is further configured to acquire the user static information through user input or interaction with a third party.

17. The system of claim 7, wherein the intention analysis module comprises:
a matching unit configured to match text contents of the current request information with a plurality of preset semantic templates to determine a matching semantic template; and
an intention determination unit configured to acquire the intention information corresponding to the matching semantic template,
wherein corresponding relationship between the semantic templates and the intention information is pre-established and stored in the knowledge base, same intention information corresponds to one or more of the semantic templates.

18. The system of claim 17, wherein the matching unit is further configured to calculate similarity between the text contents of the current request information and the plurality of preset semantic templates, and select one semantic template having the highest similarity as the matching semantic template.

19. The system of claim 17, wherein the current request information is a voice message, the interaction module further comprises a text conversion unit configured to convert the current request information into a text message.

20. The system of claim 7, wherein the interaction module further comprises a voice conversion unit configured to convert the response information corresponding to the true intention of the current request information into a voice message to be sent to the user.

* * * * *